Patented June 17, 1947

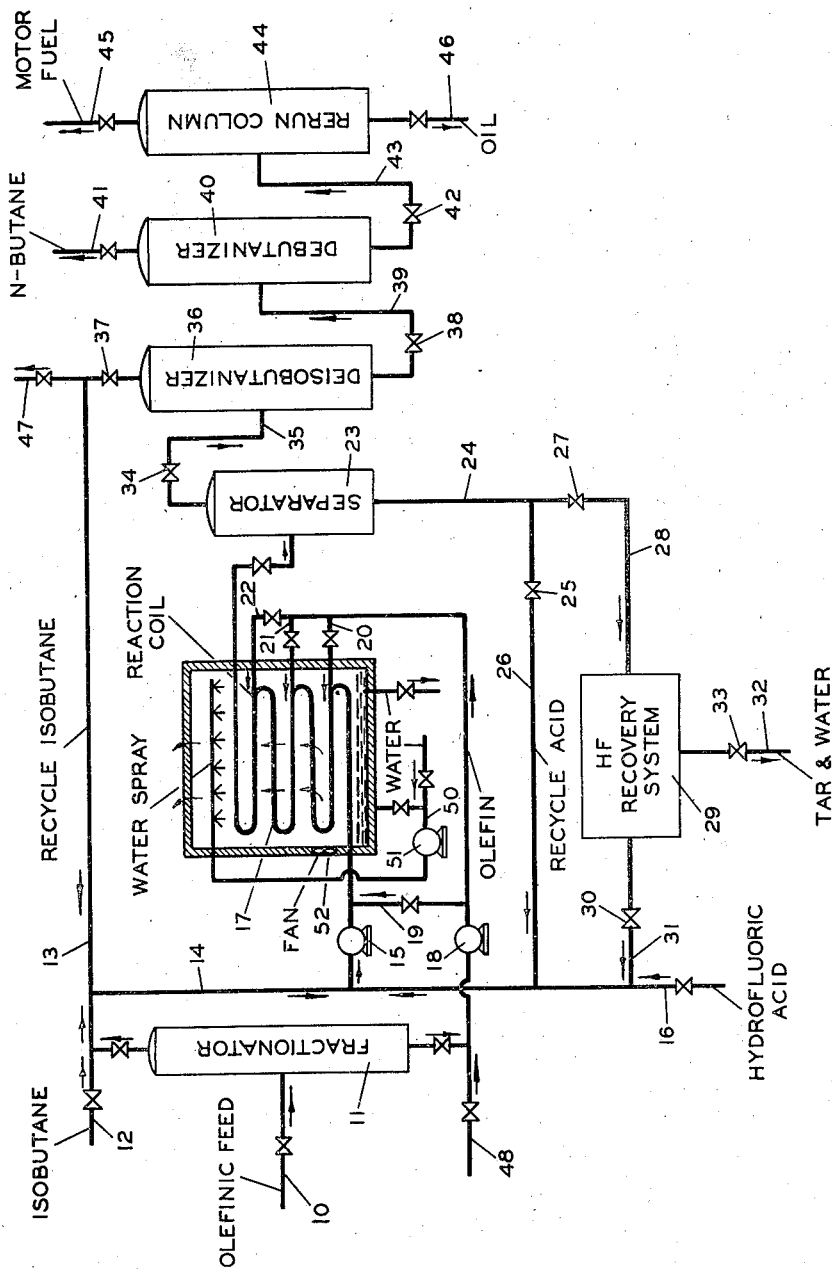

2,422,349

UNITED STATES PATENT OFFICE 2,422,349

ALKYLATION OF HYDROCARBONS

Frederick E. Frey, Bartlesville, Okla., assignor to Phillips Petroleum Company, a corporation of Delaware Application June 14, 1943, Serial No. 490,808

5 Claims. (Cl. 260—683.4)

This invention relates to the catalytic conversion of hydrocarbons. More particularly, it relates to an improved process for alkylating hydrocarbons in the presence of a catalyst. This application is a continuation-in-part of my copending application, Serial No. 315,063, filed January 22, 1940, now U. S. Patent 2,322,800, issued June 29, 1943.

Many processes have been proposed for alkylating paraffins with olefins and other alkylating reactants, such as an alkyl halide, ether, alcohol, or the like, to produce normally liquid isoparaffins suitable for use in aviation motor fuel. Several different types of reaction systems have been proposed. In my aforementioned copending application, which discloses a hydrofluoric acid-catalyzed alkylation process, one of the disclosed features comprises introducing an olefin multipointwise at successive spaced intervals into a stream comprising a catalyst and an alkylatable paraffin flowing through an elongated reaction chamber. I have now found that this feature has certain important advantages, with respect to the average or effective composition of the reaction mixture and the resulting influence on the quality of products, which other reaction systems do not have. Further, I have found that the heat of reaction may be readily removed from said elongated reaction chamber by means of a water spray and a current of air applied to its exterior surface. Still further, I have found that when the paraffin and olefin reactants for alkylation are initially present in a single mixture, appreciable improvement in quality of products can be obtained by separating at least part of said reactant paraffin from said mixture, introducing the separated paraffin into the inlet end of the elongated reaction chamber and introducing the remaining olefin-containing mixture multipointwise at successive intervals spaced along the reaction chamber. Particularly improved results are obtained when the olefin is introduced so that, as the alkylate content of the reaction mixture increases, the ratio of unreacted reactant paraffin to olefin is increased. This feature applies in the use of other alkylating catalysts also, such as sulfuric acid, chlorosulfronic acid, phosphoric acid, Friedel-Crafts catalysts, etc.

An object of the present invention is to provide an improved process for carrying out catalytic alkylations of hydrocarbons. A specific object is to provide an efficient means for removing exothermic heat of reaction. Another specific object is to increase the effective ratio of reactant hydrocarbon to product hydrocarbon in the reaction zone, whereby the proportion of surviving primary reaction products is increased. Other objects and advantages of the invention will be apparent from the accompanying description and discussion.

In all alkylation systems, the following three major conditions must be met in order to produce a high-quality product. (1) The concentration of olefin (or other alkylating reactant) throughout the reaction mixture must be maintained sufficiently low that polymerization or other olefin-olefin reactions do not occur to an appreciable extent in comparison with alkylation (olefin-paraffin reactions). (2) The concentration of product in the reaction mixture must be maintained sufficiently low relative to the concentration of reactants that secondary reactions (degradation of the primary reaction products) do not occur to an appreciable extent in comparison with primary reactions. (3) The reaction temperature must be maintained at such a value that the velocity constants of primary reactions are optimum in relation to the velocity constants of side and secondary reactions.

Condition 1 may be satisfied in practice in several ways. For example, the reaction mixture may be circulated rapidly, either externally to the reaction zone or internally, past one or more inlets through which olefin is introduced at a rate sufficiently low that it is consumed by alkylation before its concentration can build up to a value such that appreciable polymerization can occur. The olefin may be introduced multipointwise into an elongated reaction zone through which the reaction mixture flows, the distance between successive olefin inlets being sufficient to allow most of the olefin introduced at one point to be consumed by alkylation before the reaction mixture passes the next olefin inlet. It appears that, for optimum results in the alkylation of isobutane with an olefin having three to five carbon atoms per molecule, the maximum concentration of unreacted olefin in the reaction mixture should always be below about 5 mol per cent of the isobutane and usually well below 1 mol per cent. (By "unreacted olefin" is meant simple olefin-catalyst complexes as well as free olefin.) In alkylations with ethylene, somewhat higher concentrations of olefin are permissible. It should be understood that the maximum allowable concentration of olefin (or other alkylating reactant) varies appreciably with specific properties of the alkylatable hydrocarbon and the catalyst, and with temperature, and that it is extremely difficult to measure directly or even to estimate the olefin concentration accurately in catalytic systems. Although in practice the concentration of olefin is automatically fixed by other variables such as reaction time, temperature, nature of catalyst, and nature of reactants, it is of interest to the present discussion because it is a fundamental variable which may be used in deriving equations suitable for correlating experimental data and for design purposes, as will be discussed hereinafter.

Condition 2 is usually satisfied in practice by feeding a considerable excess of reactant-paraffin to the reaction zone. It appears that when condition 1 is satisfied the composition of the product may be satisfactorily correlated with the effective ratio of reactant-paraffin to product in the reaction zone by an equation of the following form:

$$(1) \quad P = \frac{100 I/A}{I/A + k}$$

Where $P$ is the volume per cent of primary reaction products in the total products, $I/A$ is the effective mol ratio of reactant-paraffin to total product in the reaction mixture, and $k$ is a constant which depends upon reaction temperature, specific properties of the reactants, and specific properties and condition of the catalyst. Theoretically, $k$ represents the ratio of the average velocity constant for secondary reactions of the first-formed or primary reaction products to the average velocity constant for formation of the primary products.

For a reaction system in which the reaction mixture is circulated rapidly past one or more feed inlets, the ratio of reactant-paraffin to product is substantially constant throughout the reaction zone and is equal to that in the total effluents from the reaction zone. As an approximation, found to be valid under reasonably good alkylation conditions under which approximately theoretical yields are obtained, the mol ratio of reactant-paraffin to product in such a "circulation" system may be said to be one less than the over-all mol ratio of reactant-paraffin to olefin in the feed to the reaction zone, including recycled, unreacted, reactant-paraffin. That is:

$$(2) \quad I/A = I/O - 1$$

where $I/O$ is the over-all mol ratio of reactant-paraffin to olefin in the feed to the reaction zone.

For a single-pass reaction system in which an olefinic stream is introduced at successive inlets into a stream of reactant-paraffin in the presence of a catalyst, the effective ratio of reactant-paraffin to product is the arithmetic means reactant-paraffin concentration in the reaction mixture divided by the arithmetic means product concentration. As an approximation, the effective mol ratio of reactant-paraffin to product in such a reaction system may be expressed in terms of the feed composition as follows:

$$(3) \quad I/A = 2I/O - J/O - 1$$

where $J/O$ is the mol ratio of reactant-paraffin to olefin in the olefinic stream which is introduced multipointwise.

From a comparison of Equations 2 and 3, it follows that for a given over-all feed in which at least part of the reactant-paraffin is separate from the olefin, a higher effective ratio of reactant-paraffin to product in the reaction zone is obtainable in a single-pass system with multipointwise introduction of olefin than in a recirculation system. Furthermore, it follows that for a single-pass multipoint system having a feed in which the reactant-paraffin and olefin are present in a single stream, an appreciable and advantageous increase in the effective ratio of reactant-paraffin to product in the reaction zone can be gained by separating at least part of the reactant-paraffin from the total feed, introducing this separated part into the first part of the reaction zone and introducing the remaining olefin-containing part into the reaction zone at successive spaced intervals.

In addition, most of the undesired secondary reactions between the alkylate and the reactants involve primarily the alkylating reactant (such as the olefins) rather than the reactant-paraffin, and I have found that a better product results in a single-pass system when the ratio of reactant-paraffin to alkylating reactant is substantially higher in the latter part of the reaction zone than in the first part of the zone. Thus, in accordance with the present invention, I find that increased yields per pass with high quality of alkylate result from single-pass operation, without recirculation of the reaction mixture or of the effluent hydrocarbon mixture, when this operation is conducted with intimate mixing of reactants and catalyst, with addition of alkylating reactant at a plurality of points along an elongated reaction zone, with a mol ratio of reactant-paraffin to alkylating reactant of about 10:1 or more at the inlet of the reaction zone and with successively higher ratios of these reactants at subsequent points of addition of the alkylating reactant, the highest ratio being 100:1 or more. As compared with a recirculation-type process, the yields of alkylate and the quality of the alkylate are higher when practicing my invention than with even higher ratios of reactant-paraffin to alkylating reactant in the recirculation-type process and, of course, the equipment is much smaller per unit volume of alkylate produced. It is also desirable, in the practice of my invention, to limit the amount of alkylate, in the final effluent of the reaction zone, to about 30 per cent by weight of the total hydrocarbons.

Condition 3, relative to maintenance of an optimum reaction temperature, requires the striking of a balance among several factors which vary with specific properties of reactants and catalysts. In general, the over-all velocity constant for polymerization and similar side reactions of olefins appears to be about as high or higher, and to have a lower temperature coefficient, than that for alkylation; hence, increasing the reaction temperature tends to increase the rate of alkylation relative to polymerization in the reaction mixture, provided that condition 1 (satisfactorily low-olefin concentration) is satisfied. Since there is necessarily a relatively high momentary local concentration of olefin at the point of introduction of olefin, condition 1 is somewhat harder to satisfy at the higher temperatures. That is, an increase in temperature makes it necessary to disperse the incoming olefin with increased rapidity in order to prevent appreciable polymerization resulting from high local concentrations of olefin at the olefin inlets.

The over-all velocity constant for degradation of the primary products by secondary reactions such as secondary alkylation, reconstruction, isomerization, or the like appears to be slightly higher and to have a higher temperature coefficient than the constant for primary alkylation. Hence to minimize degradation of primary alkylate, it is desirable to maintain as low a reaction temperature as possible without unduly extending the required reaction time, or without causing excessive polymerization of the olefin.

One especially advantageous mode of alkylation employing multipointwise addition of olefin at successive spaced inlets along an elongated reaction zone comprises correlating the rate of olefin introduction with the cross-sectional area of the reaction zone and with the velocity of flow along the reaction zone at each particular olefin inlet in such a way that this rate is progressively decreased in the direction of flow in correspondence with the increase in the local concentration of inerts (hydrocarbons other than reactant or alkylatable hydrocarbon) caused by removal of alkylatable hydrocarbon through reaction with the olefin, whereby the concentration of unreacted olefin decreases and the ratio of reactant paraffin to olefin increases.

An understanding of some aspects of the invention may be aided by references to the accompanying drawing which is a schematic flow diagram of a preferred arrangement of apparatus for practicing the invention. Although for the sake of brevity and specific illustration the following discussion is concerned principally with the alkylation of isobutane with butylenes in the presence of concentrated hydrofluoric acid, the invention is applicable to many other alkylations and should not be limited unduly by mention of specific reagents, apparatus, catalysts, or conditions.

A $C_4$ fraction of refinery gases comprising isobutane, normal butane, and butylenes may be admitted through inlet 10 to fractionator 11, wherein it is separated into an isobutane-rich fraction and a butylene-rich fraction. Preferably this fractionation is so conducted that only a minor amount of olefins is included with the isobutane. The isobutane-rich fraction, which with optional additional isobutane admitted through inlet 12 and/or recycle conduit 13 preferably contains not more than about 2 mol per cent of olefins, is passed in liquid phase through conduit 14 to pump 15 whereby it is thoroughly mixed with liquid concentrated hydrofluoric acid, which may be admitted through inlet 16, and is forced through reaction coil 17. The butylene-rich fraction from fractionator 11 is forced by pump 18 through a plurality of jet inlets, such as at 19, 20, 21, and 22, into reaction coil 17. If desired, or expedient, the sole charge to the process may be isobutane through conduit 12 and an olefin-containing fraction through conduit 48.

Reaction coil 17 preferably comprises a number of lengths of steel pipe joined by U-bends at the ends to form a single continuous reaction tube. The coil should be so dimensioned that flow of fluid through it is turbulent; the linear velocity may be from about 2 to 8 feet per second or more, depending somewhat upon the size of the pipe. However, in order to obtain and maintain intimate and thorough mixing, or emulsification, of the liquid hydrofluoric acid and liquid hydrocarbon material a rate of flow greater than that which will just give turbulent flow is generally desirable, and such a rate may be as high as 50 or 100 feet per second, or more. As the rates of flow increase the power costs for operating the pump 15 increase materially, and in any specific case it will be necessary to strike a suitable balance between improved alkylation on one hand and operating costs on the other, which can be readily appreciated and determined by one skilled in the art, in the light of the present disclosure and discussion. Olefin inlet jets may be conveniently located at the U-bends, and for hydrofluoric acid alkylations may be designed to operate with a pressure drop of about 50 to 500 pounds per square inch. In general, the pressure drop across the olefin inlet jets should be sufficient to disperse the olefin rapidly and uniformly throughout the reaction stream. Preferably the rate of olefin introduction at any jet is not more than about 2 mol per cent of the rate of flow of isobutane past the jet i. e. a mol ratio of isobutane to olefin of at least about 50:1; at higher rates of olefin introduction, polymerization at the olefin inlet tends to become excessive, owing to high local concentrations of olefin. The reaction coil, if horizontal, may be arranged so that the reaction mixture flows upward around most of the U-bends in order to minimize the tendency for hydrofluoric acid to settle to the bottom of the conduit. However, if the reaction coil is arranged with the straight sections positioned vertically this tendency is eliminated. In a vertical coil the hydrofluoric acid and hydrocarbon phases may be maintained in a state of intimate mixture simply by maintaining turbulent flow conditions or a linear velocity greater than the velocity of settling or stratification. Thus a lower linear velocity and a correspondingly shorter coil may be used if the coil is positioned vertically than if it is positioned horizontally.

In a preferred modification, the pipes of the reaction coil are spaced several inches apart, wooden slats (not shown) are supported in the spaces, water is introduced through conduit 50 and pump 51 and is sprayed on the top of the coil, and a current of air is blown by fan 52 through the coil externally to the pipes, thereby effecting rapid removal of the heat of reaction and permitting a desired reaction temperature to be readily maintained. Preferably a corrosion inhibitor is added to the spray water and/or the exterior surfaces of the reaction coil are painted or otherwise treated to minimize corrosion. Painting reduces the cooling efficiency somewhat but usually the resulting decrease in corrosion will more than offset such a minor loss in cooling efficiency.

From reaction coil 17, the reaction mixture or stream is passed to separator 23 where it is separated into a liquid hydrocarbon phase and a liquid hydrofluoric acid phase. The denser or hydrofluoric acid phase is withdrawn through pipe 24 and may be returned to the reaction system through valve 25 and pipe 26. Generally a substantial portion of the acid is so recycled. If desired, the hydrofluoric acid may be withdrawn through valve 27 and pipe 28 to acid-recovery system 29, where the acid-soluble materials and any water which may be present are removed. After this treatment, the acid may be returned to the reaction system through valve 30 and pipe 31, and the tar and water may be withdrawn, as through outlet 32 controlled by valve 33.

The hydrocarbon phase including dissolved hydrofluoric acid, is passed from separator 23 through valve 34 and conduit 35 to deisobutanizer 36. The unconverted or unreacted isobutane, associated with this dissolved hydrofluoric acid, is recycled through valve 37 and conduit 13 to the reaction coil. Any portion or all of this stream may be discharged through conduit 47 for separation of light gases, such as propane etc., which may be present in the charge and/or may be formed in small amounts by side reactions. The isobutane-free alkylate is removed from the kettle of the deisobutanizer through valve 38 and conduit 39 to debutanizer 40, where the normal butane is removed through outlet 41. The butane-free alkylate is passed through valve 42 and conduit 43 to rerun column 44, in which it is fractionated into a motor-fuel fraction and a heavy or oil fraction; it also may be subjected to any other treatment, such as caustic washing, fractionation, and the like, as may be desired or necessary. The motor-fuel fraction is withdrawn as a product through outlet 45, and the oil fraction through outlet 46.

It will be understood that the flow diagram is schematic only, and that many additional pieces of equipment, such as pressure gauges, flowmeters, pumps, heat exchangers, reflux accumulators, reflux lines, and the like, will be necessary in any particular installation and can be installed by anyone skilled in the art. However, the essential equipment and material flows have been described in sufficient detail to serve as an efficient guide. When using a solid catalyst, it may be suspended in a reaction mixture, to form a slurry, or it may be used in a long bed, or in a series of beds which together will comprise a single reaction zone, with suitable removal of heat, and with addition of olefin along the length of the reaction zone in the manner disclosed and discussed herein.

To illustrate further some aspects of my invention, the following example is given.

A liquefied butane-butylene fraction of refinery gases comprising isobutane and butylenes in a mol ratio of 3 to 1 and some normal butane is introduced to a hydrofluoric acid alkylation system similar to that illustrated in the drawing. Most of the isobutane is separated from the mixture by fractionation as an olefin-poor overhead stream, giving a residue or kettle stream rich in olefin; the compositions of these streams are as follows:

|  | Total butane-butylene fraction | From fractionation | |
|---|---|---|---|
|  |  | Overhead | Residue |
|  | Mol % | Mols | Mols |
| Isobutane | 50.5 | 45.4 | 5.1 |
| n-Butane | 32.6 | 1.6 | 31.0 |
| Isobutylene | 4.6 | 0.9 | 3.7 |
| 1-butene | 4.5 | 0.9 | 3.6 |
| 2-butene | 7.8 | 0.4 | 7.4 |
|  | 100.0 | 49.2 | 50.8 |

The isobutane-rich, or overhead, fraction from the fractionation is introduced into the inlet end of the reaction coil with hydrofluoric acid to give a mixture having 44 percent by volume hydrocarbon and 56 per cent by volume hydrofluoric acid. The residual or butylene-normal butane mixture is introduced multipointwise into the reaction coil at spaced intervals, so that the "space-time," which is volume of acid divided by rate of olefin addition in volumes per minute, is about 100 from one addition point to the next. Since the normal butane or inert content of the reaction stream increases as the butylene-normal butane stream is added progressively, the rate of addition of this olefin stream is progressively decreased in the direction of flow not only to counterbalance the effect of the decrease in isobutane concentration caused by consumption to form the alkylate but also to counterbalance the effect of the increase in the local concentration of inerts in the reaction stream, as is shown by the data in the following tabulation, and to counterbalance the increased concentration of alkylate.

| Addition Point | Mols olefin added | Mols present after addition | | Isobutane-olefin at addition point | Composition after reaction, mol per cent | | | Isobutane/Alkylate after reaction |
|---|---|---|---|---|---|---|---|---|
|  |  | i-C$_4$H$_{10}$ | n-C$_4$H$_{10}$ |  | i-C$_4$H$_{10}$ | n-C$_4$H$_{10}$ | Alkylate |  |
| Entrance | [1] 5.6 | 46.6 | 8.8 | 8.3 | 74.0 | 15.9 | 10.1 | 7.3 |
| 1 | 5.1 | 42.7 | 19.6 | 8.4 | 55.3 | 28.9 | 15.8 | 3.5 |
| 2 | 2.3 | 38.4 | 24.5 | 16.7 | 49.0 | 33.3 | 17.7 | 2.8 |
| 3 | 1.6 | 36.6 | 27.8 | 22.9 | 45.2 | 35.9 | 18.9 | 2.4 |
| 4 | 1.5 | 35.5 | 31.0 | 23.6 | 41.9 | 38.2 | 19.9 | 2.1 |
| 5 | 0.7 | 34.3 | 32.5 | 49.0 | 40.5 | 39.2 | 20.3 | 2.0 |
| 6 | 0.1 | 33.7 | 32.6 | 337 | 40.4 | 39.2 | 20.4 | 2.0 |

[1] Includes 2.2 mols in isobutane stream.

The temperature in the reaction coil is maintained at about 115° F. by means of a circulating water spray and a forced draft of air applied to the exterior surface of the reaction coil. The effluent from the reaction coil is allowed to settle; most of the resulting HF layer is recycled to the inlet of the reaction coil, and part is passed to acid-regeneration means for purification. The hydrocarbon layer from the settling step is debutanized, and the alkylate is fractionated to remove a small proportion of relatively high-boiling material or heavy alkylate. The resulting gasoline-range alkylate has a clear A. S. T. M. octane number of 90.9. For comparison, passing the same feed directly to the reaction coil instead of first separating it into an isobutane-rich fraction and a butylene-normal butane fraction results in an A. S. T. M. octane number of 88.4. At a temperature of 75° F., the octane number of the gasoline product from alkylation by the special multipoint addition of olefin-rich fraction is 92.5, whereas passing the feed directly to the reaction coil gives only 90.4. These data show that considerable improvement in the quality of the hydrofluoric acid alkylation product is affected by feeding the reactant paraffin-rich stream separately from the olefins in the manner described hereinbefore.

The invention may be practiced otherwise than as specifically shown, and many variations and modifications of it will be apparent to those skilled in the art in the light of the present disclosure and discussion.

I claim:

1. An improved process for reacting by catalytic alkylation butylenes and isobutane contained in an olefin-containing C$_4$ hydrocarbon mixture to produce paraffins of higher molecular weight, which comprises subjecting such a mixture to fractional distillation and recovering as a low-boiling fraction a fraction rich in isobutane and contaning no more than a minor proportion of the olefins in the original mixture and as a high-boiling fraction a fraction containing no more than a minor amount of isobutane and a major proportion of the olefins in the original mixture, passing said low-boiling fraction in admixture with liquid hydrofluoric acid to one end of an elongated alkylation zone comprising a series of horizontal pipes in a vertical row joined at the ends to form a continuous upwardly rising coil, adding said mixture at the bottom of said coil and flowing said mixture upwardly through said coil at a flow rate such that intimate admixture of liquid hydrofluoric acid and liquid hydrocarbons is maintained, adding portions of said high-boiling fraction at successive points along the length of said reaction zone in amounts such that the mol ratio of isobutane, in the mixture at the first point of addition, to olefin in the portion added at said first point is at least 50:1 and such that the mol ratio of unreacted isobutane in the mixture to olefin added at each successive point is progressively higher, spraying water over the outside of said coil and forcing air over the outside of said coil generally concurrect to the flow of reactants through said coil and countercurrent to the flow of said sprayed water, withdrawing the resulting reaction mixture from the top of said coil and recovering therefrom a fraction comprising paraffins of higher molecular weight so produced.

2. In a process for catalytically alkylating an alkylatable hydrocarbon in an elongated reaction zone of the pipe-coal type at a reaction temperature near atmospheric, the improvement which comprises passing an intimate liquid mixture of an alkylatable hydrocarbon and liquid alkylation catalyst to a pipe coil comprising a series of horizontal pipes in a vertical row joined at the ends to form a continuous upwardly rising coil, adding said mixture at the bottom of said coil and flowing said mixture upwardly through said coil at a rate of at least 2 feet a second and sufficient to obtain and maintain intimate and thorough mixing of said liquid hydrocarbons and of said liquid catalyst, adding an olefin-containing material at a series of points along the length of said coil in an amount at each said point such that the ratio of unreacted alkylatable hydrocarbon to unreacted olefin is progressively higher at successive points in the direction of flow of said mixture, spraying water over the outside of said coil, forcing air over the outside of said coil generally countercurrent to the flow of reactants through said coil and countercurrent to the flow of said sprayed water, passing the resulting reaction mixture from the top of said coil and recovering therefrom an alkylate fraction so produced.

3. In a process for catalytically alkylating an alkylatable hydrocarbon in an elongated reaction zone of the pipe-coil type at a reaction temperature near atmospheric, the improvement which comprises passing an intimate liquid mixture of an alkylatable hydrocarbon and liquid alkylation catalyst to a pipe coil comprising a series of horizontal pipes in a vertical row joined at the ends to form a continuous upwardly rising coil, adding said mixture at the bottom of said coil and flowing said mixture upwardly through said coil at a rate of at least 2 feet a second and sufficient to obtain and maintain intimate and thorough mixing of said liquid hydrocarbons and of said liquid catalyst, adding an olefin-containing material at a series of points along the length of said coil, spraying water over the outside of said coil, forcing air over the outside of said coil generally concurrent to the flow of reactants through said coil and countercurrent to the flow of said sprayed water, passing the resulting reaction mixture from the top of said coil and recovering therefrom an alkylate fraction so produced.

4. The process of claim 2 in which said alkyatable hydrocarbon is a low-boiling isoparaffin and said liquid alkylation catalyst is hydrofluoric acid.

5. The process of claim 3 in which said alkylatable hydrocarbon is a low-boiling isoparaffin and said liquid alkylation catalyst is hydrofluoric acid.

FREDERICK E. FREY.

REFERENCES CITED

The following references are of record in the file of this patent:

UNITED STATES PATENTS

| Number | Name | Date |
|---|---|---|
| 2,002,394 | Frey | May 21, 1935 |
| 2,246,703 | Thiele | June 24, 1941 |
| 2,260,990 | Goldsby | Oct. 28, 1941 |
| 2,267,730 | Grosse | Dec. 30, 1941 |
| 2,273,041 | Ipatieff | Feb. 17, 1942 |
| 2,311,096 | Strawn | Feb. 16, 1943 |
| 2,314,435 | Allender | Mar. 23, 1943 |
| 2,322,800 | Frey | June 29, 1943 |
| 2,325,052 | Grosse | July 27, 1943 |
| 849,944 | Heuvel | Apr. 9, 1907 |
| 2,327,926 | Oakley | Aug. 24, 1943 |
| 2,332,564 | Egloff | Oct. 26, 1943 |
| 2,335,704 | Smith | Nov. 30, 1943 |
| 2,357,607 | Ocon | Sept. 5, 1944 |
| 2,370,771 | Bowerman | Mar. 6, 1945 |

FOREIGN PATENTS

| Number | Country | Date |
|---|---|---|
| 538,307 | Great Britain | July 29, 1941 |